UNITED STATES PATENT OFFICE.

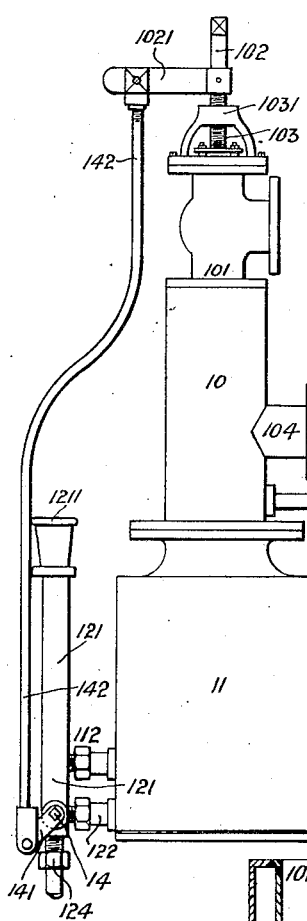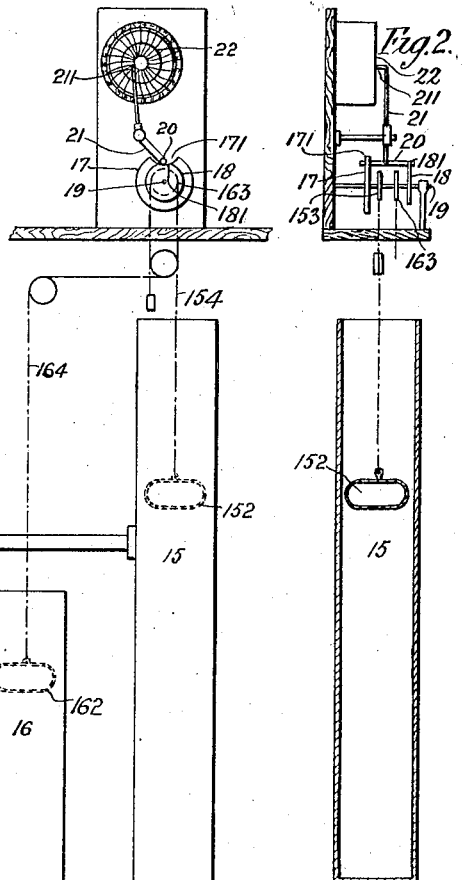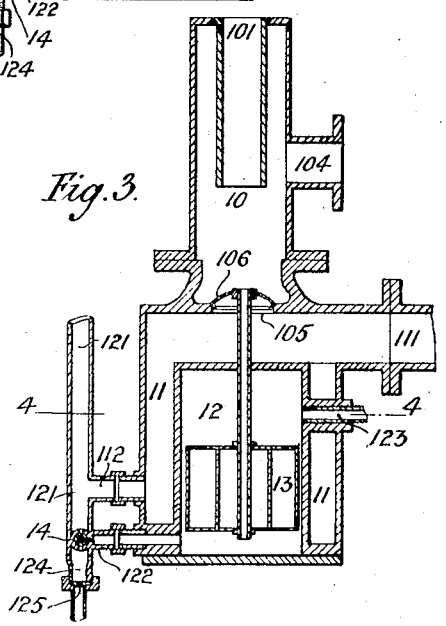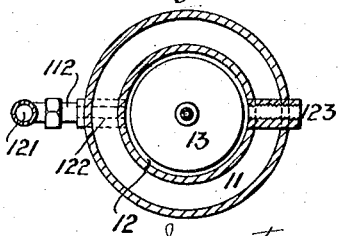

WILLIAM GRANT MORRIS, OF CAIRO, EGYPT.

VALVE.

1,328,009.         Specification of Letters Patent.         Patented Jan. 13, 1920.

Application filed September 5, 1918. Serial No. 252,676.

*To all whom it may concern:*

Be it known that I, WILLIAM GRANT MORRIS, a subject of the King of Great Britain, residing at Eaux de Caire, Rod-el-Farag, Cairo, Egypt, have invented a new and useful Improvement in Valves, of which the following is a specification.

This invention relates to mechanism which automatically change the discharge of liquid from one outlet to another after a predetermined period of time.

The accompanying drawings show an apparatus made in accordance with this invention. Figure 1 is an elevation, Fig. 2 a section through the indicating mechanism, Fig. 3 a vertical section of the valve and Fig. 4 is a horizontal section on the line 4—4 of Fig. 3.

The mechanism consists of three chambers 10, 11 and 12. The chamber 10 communicates with the water supply through an inlet 101 controlled by a valve upon whose spindle 102 is a screw 103 engaging with a nut on a bracket 1031. The chamber 10 has an outlet 104 and is in communication with the chamber 11 through an orifice 105 controlled by a valve 106. The chamber 11 has an outlet 111 and is in communication with the chamber 12 through pipes 112, 121 and 122. In the chamber 12 is a float 13 which is connected to the valve 106 and this chamber is provided with an overflow pipe 123 and can be discharged through the pipe 122 past a three-way cock 14 to a pipe 124. In the discharge pipe 124 is a perforated disk 125 which regulates the rate of flow of the discharge. The pipe 121 is continued upward and has a mouth 1211 through which the chamber 12 can be supplied with water. The three-way cock 14 is in the pipe 121 and is operated by an arm 141 connected by a rod 142 to another arm 1021 on the spindle 102, so that when the spindle is turned the cock 14 receives a corresponding movement. The cock 14 is so connected to the spindle 102 that when the inlet 101 is opened the connection between the chambers 11 and 12 is closed and the discharge of the chamber 12 is open.

In order to prepare the valve for action liquid is supplied through the mouth 1211 to the chamber 12, causing the float 13 to rise and the valve 106 to be opened. On opening the inlet 101 of the chamber 10 the cock 14 will be moved, closing the connection between the chambers 11 and 12 and opening the discharge of the chamber 12. The liquid passes through the chamber 10 into the chamber 11 and through the outlet 111, until the liquid in the chamber 12 has been lowered, thereby causing the float 13 to descend and the valve 106 to be closed. The liquid will then flow through the outlet 104 of the chamber 10. When the inlet 101 is closed the cock 14 closes the discharge of the chamber 12 and opens the connection between the chambers 11 and 12, allowing liquid to flow into the chamber 12, thereby raising the float 13 and opening the valve 106.

The chambers 10 and 11 are connected to vessels 15 and 16 by pipes 151 and 161, and in these vessels are floats 152 and 162 respectively connected to pulleys 153 and 163 by flexible connections 154 and 164. The pulley 153 is connected to a disk 17 and the pulley 163 to a disk 18, all being mounted on a shaft 19. In the disks 17 and 18 are recesses 171 and 181 in which rests a bar 20 connected to a pivoted lever 21 carrying a pen 211. When liquid is discharged from either of the chambers 10, 11, part of it enters the vessels 15 or 16, raising the float therein and turning the corresponding disk upon the shaft 19 so that the bar 20 leaves the recess and rests upon the periphery of the said disk, causing the pen 211 to move into one or other position upon a clock driven diagram 22. The length of time the liquid is flowing from one or other of the chambers 10, 11, is recorded on the diagram 22.

A weight 23 is attached by a flexible connection 231 to the pulley 153 as a counterbalance.

What I claim is:—

1. A mechanism comprising three chambers, a water supply to the first chamber, water outlets from the first and second chambers, a passage between the first and second chambers, a valve in the passage, a float in the third chamber, connecting means between the valve and float, an inlet to the first chamber, a valve in the inlet, a passage between the second and third chambers, a discharge to the third chamber, means for controlling said passage and discharge, and interrelated devices for operating said last mentioned valve and means.

2. A mechanism comprising three chambers, a passage between the first and second chambers, valves in the passage, a float in the third chamber, a stem connecting the valve and the float, an inlet to the first chamber, a valve in the inlet, a passage between the second and third chambers, a discharge to the third chamber, a three-way cock regulating both the flow between the second and third chambers and the flow of the discharge, and interrelated means for operating the valve in the inlet and the three-way cock.

3. A mechanism comprising three chambers, a water supply to the first chamber, water outlets from the first and second chambers, a valve in a passage between the first and second chambers controlled by a float in the third chamber and means for operating a valve in the inlet of the first chamber which also controls the supply and discharge of the third chamber.

4. A mechanism for regulating the flow of fluids, comprising three chambers, a fluid supply to the first chamber, fluid outlets from the first and second chambers, a passage between the first and second chambers, means for regulating the flow through said passage controlled by the liquid level in the third chamber, means for controlling the fluid supply to the first chamber which also controls the supply and discharge of the third chamber, and additional means for regulating the rate of discharge from said third chamber.

5. A mechanism for regulating the flow of fluids, comprising three chambers, a fluid supply to the first chamber, fluid outlets from the first and second chambers, a passage between the first and second chambers, means for regulating the flow through said passage controlled by the liquid level in the third chamber, means for controlling the fluid supply to the first chamber which also controls the supply and discharge of the third chamber, and additional means for filling said second chamber.

6. A mechanism for regulating the flow of fluids, comprising three chambers, a fluid supply to the first chamber, fluid outlets from the first and second chambers, a passage between the first and second chambers, a float operated valve for regulating the flow through said passage controlled by the liquid level in the third chamber, and means for controlling the fluid supply to the first chamber which also controls the supply and discharge of the third chamber.

7. A mechanism for regulating the flow of fluids, comprising three chambers, a fluid supply to the first chamber, a valve for controlling said fluid supply, a float in the third chamber, a passage between the first and second chambers, a valve actuated by said float for controlling the flow through said passage, a discharge for the third chamber, means for controlling said discharge, and interrelated devices for operating said fluid supply valve and said means.

8. A mechanism for regulating the flow of fluids, comprising an inlet chamber, a float chamber, an intermediate chamber, a passage between the inlet and intermediate chambers, a valve for said passage controlled by the liquid level in the float chamber, a second passage between the intermediate and float chambers, a discharge for the float chamber, means for controlling the flow through said second passage and said discharge, a controlling valve for the inlet chamber, and interrelated devices for operating said means and said controlling valve.

9. A mechanism for regulating the flow of fluids, comprising an inlet chamber, a float chamber, an intermediate chamber, a passage between said inlet and said intermediate chambers, a valve controlled by the liquid level in the float chamber for opening and closing said passage, a second passage between the intermediate and float chambers, a valve for controlling said passage, a valve for the inlet chamber, and interrelated devices for simultaneously operating said last mentioned valves.

10. A mechanism for regulating the flow of fluids, comprising an inlet chamber, a float chamber, an intermediate chamber, a passage between said inlet and said intermediate chambers, a valve controlled by the liquid level in the float chamber for opening and closing said passage, a second passage between the intermediate and float chambers, a valve for controlling said passage, a valve for the inlet chamber, interrelated devices for simultaneously operating said last mentioned valves, and a discharge for the float chamber, said discharge being controlled by said second mentioned valve.

WILLIAM GRANT MORRIS.

Witnesses:
Geo. L. Brandt,
A. Madeery.